United States Patent
Munyon et al.

[11] Patent Number: 5,969,269
[45] Date of Patent: Oct. 19, 1999

[54] FLEXIBLE COUPLING WITH TORQUE MEASURING AND DETECTING DEVICE

[75] Inventors: Robert E. Munyon; Jossef Zilberman, both of Columbia, Md.

[73] Assignee: Kop-Flex, Inc.

[21] Appl. No.: 08/946,345

[22] Filed: Oct. 7, 1997

Related U.S. Application Data

[60] Provisional application No. 60/027,800, Oct. 10, 1996.

[51] Int. Cl.$^6$ ................................ G01L 3/10; G01L 3/12
[52] U.S. Cl. ................................ 73/862.328; 73/862.329
[58] Field of Search ................ 73/862.321, 862.322, 73/862.324, 862.325, 862.328, 862.329, 862.333, 862.334

[56] References Cited

U.S. PATENT DOCUMENTS

| | | | |
|---|---|---|---|
| 3,543,649 | 12/1970 | Martin | 91/507 |
| 3,587,305 | 6/1971 | Parkinson | 73/862.08 |
| 4,592,241 | 6/1986 | Obayashi et al. | 73/862.38 |
| 4,809,557 | 3/1989 | Maurer et al. | 73/862.322 |
| 5,067,354 | 11/1991 | Kawai | 73/862.328 |
| 5,228,349 | 7/1993 | Gee et al. | 73/862.336 |
| 5,237,880 | 8/1993 | Dobler et al. | 73/862.321 |
| 5,440,762 | 8/1995 | Schill | 2/104 |
| 5,450,761 | 9/1995 | Zilberman et al. | 73/862.324 |

*Primary Examiner*—Max Noori
*Attorney, Agent, or Firm*—W. Warren Taltavull; Farkas & Manelli

[57] ABSTRACT

A flexible coupling and torque monitoring device includes a hub having two sets of flexible spokes extending radially outwardly from a common hub to respective separate rims; the rims are each provided with fingers attached at one end to one rim and with the opposite end extending over the other rim with the fingers of one rim interspersed with the fingers of the other rim; the rims are each attachable respectively to the end of a drive and driven shaft; a sensing member is located radially outwardly of the rims to detect deviations in the spacing between the fingers.

21 Claims, 3 Drawing Sheets

FLEXIBLE COUPLING WITH TORQUE MEASURING AND DETECTING DEVICE

FIELD OF THE INVENTION

This is the continuation of provisional application No. 60/027,800 filed Oct. 10, 1996.

The present invention relates to torque meters for rotating hollow or solid shafts such as drive shafts to provide a compact device for closely monitoring torque transmission of the shaft or coupled shafts during operation.

BACKGROUND OF THE INVENTION

As has long been known, high speed torque transmission can result in premature failure of a drive shaft and/or coupling where operation above the transmission limits of a drive train or deviations caused by flexing of one or several members of the train that are coupled takes place which goes uncorrected for a period of time. In the past, measurement of torque, deflection and other conditions of a rotating shaft has usually involved the placement of interengaging toothed elements such as exciter wheels on the shaft together with a sensor which may be optical or magnetic and which is responsive to the spacing or change in spacing between the teeth of exciter wheels that are placed on the shaft. Devices representative of the prior art will be found in U.S. Pat. Nos. 3,587,305; 3,543,649; 5,228,349 and 5,440,761.

While the devices of the foregoing patents have provided adequate measurement of torque caused deflections that occur in a rotating shaft, they increase the weight of the coupling by a significant amount and have adverse effects on the system rotor dynamics.

SUMMARY OF THE INVENTION

The present invention endeavors to provide a light and inexpensive torque measuring or sensing device which can operate across a flexible coupling between a drive and driven shaft so that should there occur any deviations from a standard, for example, in the magnitude of torque transmitted across the coupling, a sensor will be able to readily detect the deviation and provide a signal to a monitor.

In a preferred embodiment the present invention utilizes a torque sensor in the form of a metal or high molecular weight or high density plastic member having a hub, a plurality of spokes extending in two sets spaced axially apart from said hub with each set of spokes separately supporting an outer peripheral rim. The rims outer surfaces may carry or support exciter elements such as interengaging ferromagnetic teeth with one set on one rim interleaved with another set mounted on the other rim. The spokes of each set may each carry detectable elements such as reflective members or coatings or ferromagnetic elements that can be readily detected by electromagnetic sensors of conventional construction. With such arrangements, the torque meter will be interposed in a flexible coupling such that torque transmitted through the flexible coupling will first pass through the torque meter before transmission to an output shaft at the other end of the flexible coupling. With an appropriate detector located about the torque meter, non-standard operation can be readily detected due to the flexing of the spokes of the two sets which cause misalignment between the teeth or similar exciter elements relative to the detecting element to provide an indication of the operation whether they are optical or electromagnetic in nature.

DETAILED DESCRIPTION OF THE INVENTION

Figure 1:
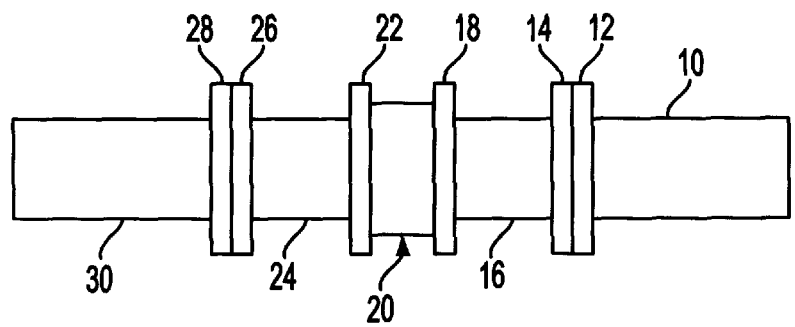
FIG. 1 is a schematic illustration of a flexible coupling between a drive and a driven shaft using the torque meter of the present invention.

Referring now to the drawings wherein like numerals designate corresponding parts throughout the several views, there is shown in FIG. 1, a schematic illustration of a shaft coupling useful with the present invention. Specifically, a drive shaft which, at one end (to the right), is connected to a drive source (not shown) and is provided with a coupling flange 12 which is bolted to a flange 14 of a flexible coupling arrangement comprising a spacer tube 16 which itself has a flange 18. As will be described below, the torque meter 20 of the present invention is fixedly interposed between flange 18 and a similar flange 22 of spacer tube 24. The opposite end of spacer tube 24 is provided with a flange 26 which is rigidly coupled to the flange 28 of a driven shaft 30.

Figure 2:
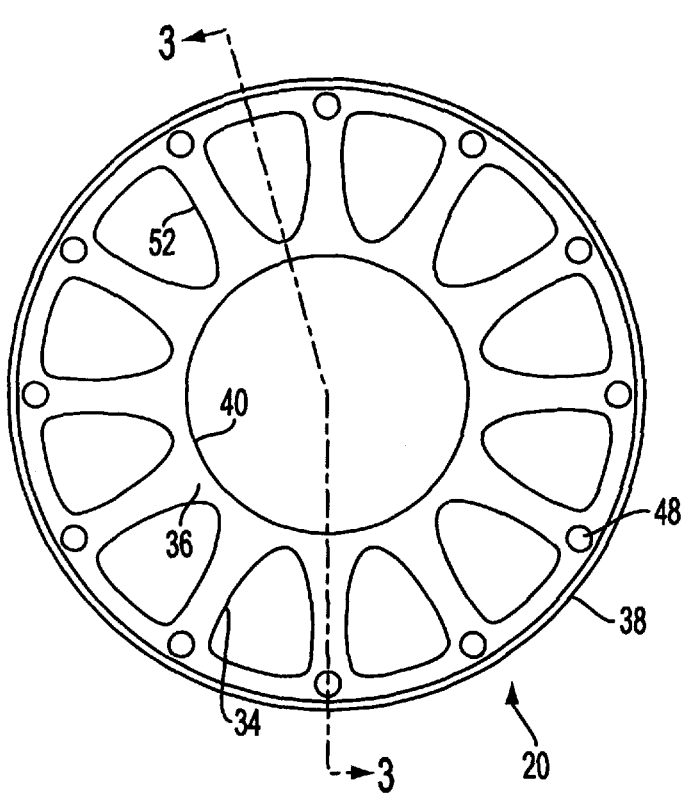
FIG. 2 is a side view in elevation of the torque meter of the present invention.
Figure 3:
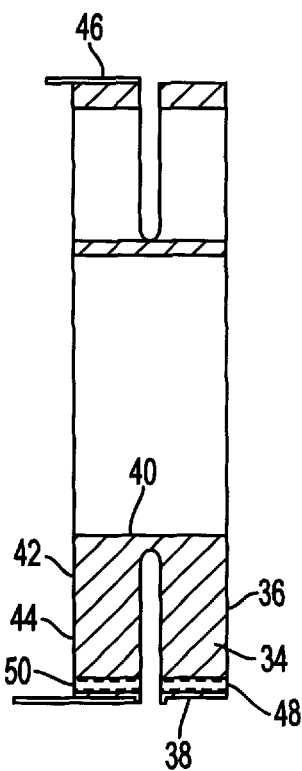
FIG. 3 is a view along lines 3—3 of FIG. 2.

With reference to FIG. 2, there is shown a side view in elevation of the torque indicator or meter 20 of the present invention. The torque meter 20 is in the form of a disk or wheel having two sets of substantially identical spokes. As shown in FIG. 2, one set of spokes 34 of disk 36 are shown and each has its outer end formed integrally with the outer peripheral rim 38 of the disk 36 and terminate integrally with a hub 40 which is common to both disks. As shown in FIG. 3, the second disk 42 is formed with a substantially identical array of spokes 44 which, in an unstressed state, are in substantial axial alignment with the spokes 34 as shown in FIG. 2. A separate outer circumferential rim 46 is provided for the second disk 42 and with which the outer ends of spokes 44 are integrally formed or attached. Adjacent the outer ends of each of the spokes 34 and 44, bore holes 48 and 50 are respectively provided to permit attachment of the meter 20 adjacent the outer rims 38, 46 to the respective flanges 18 and 22 of the flexible coupling which comprises elements 14, 16, 18, 22, 24 and 26. In essence, the torque element consists of two spoke wheels connected with a tubular member at their inner section. Torque is applied at the outer periphery of one wheel, traverses the tapered spoke sections and is transmitted to the rest of the coupling through the periphery of the second wheel.

As shown further in FIG. 2, the individual spokes on each of the disks 36, 42 narrows from its inner base adjacent hub 40 to a reduced thickness portion 52 intermediate its ends and then thickens or widens gradually as the spoke approaches the rim 38 or 46, respectively. The high degree of flexibility in the torque direction which is effected by selective material placement, that is, the spokes, allows for a compact and light weight torque sensing device. The design of the wheels and spoke elements is based on two fundamental requirements. First, the torque elements must be soft in the circumferential direction and, second, the shape of the spokes must provide a more uniform stress distribution along a radial spoke axis.

For most applications, the entire torque meter 20 may be constructed from a high density neoprene elastomer while for high torque measurements, the torque meter 20 may be manufactured from a steel alloy.

Figure 4:
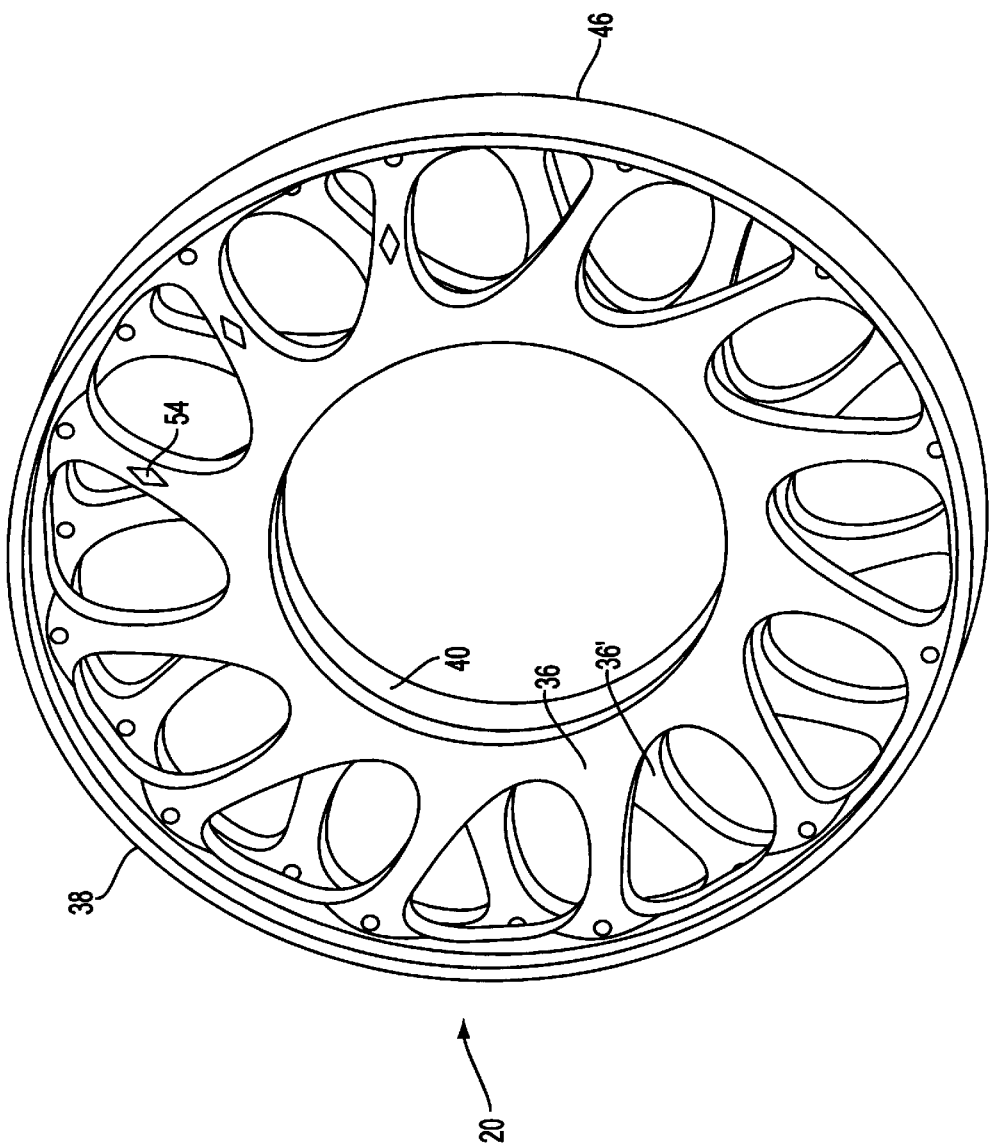
FIG. 4 is a perspective view of the torque meter of the present invention in a flexed condition.
Figure 5:
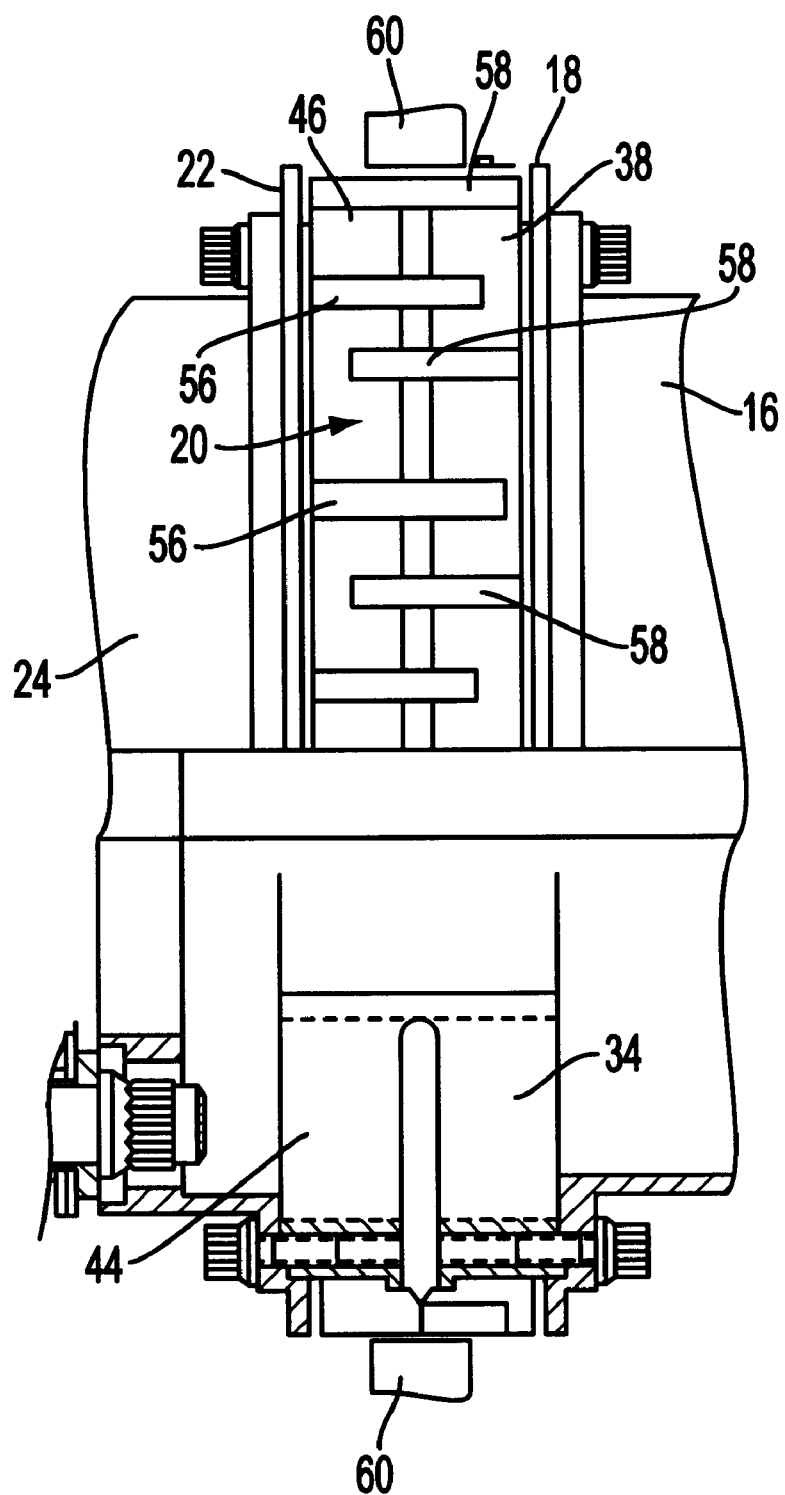
FIG. 5 is a side view of a torque meter of the present invention with exciter teeth mounted on the exterior.

In use of the device, a selected one or each of the spokes on the external surface thereof may be provided with a patch or coating with a reflective surface which will be illuminated in use with a photodetector employed to detect the frequency of the rotation of the shaft. Where the shaft is distorted as shown in FIG. 4 as a result of a torque transmission imbalance, the photodetector will immediately detect an increase in frequency since the reflective spots such as at 52 will suddenly increase when a photodetector detects the reflective surface on the adjacent wheel due to shifting of the rims 46 and 38 relative to one another which will offset the spokes of the two disks and expose an increase in reflective surfaces to a counter coupled to the photodetector. Similar detectors using ferromagnetic sensors and exciters may also be employed such as those disclosed in the aforementioned U.S. Pat. No. 5,450,761, the disclosure of which is incorporated herein and relied upon. As shown in FIG. 5, the outer rims 38 and 46 carry exciter teeth in equally peripherally spaced relation at 56 on rim 46 and 58 on rim 38. At least on detector 60 is positioned as shown. Two such sensors 60 may be employed with one serving as a back up. The individual teeth may be epoxy bonded to their respective rims where the meter 20 is made from a synthetic material or plastic and may be welded in place where the meter is metal.

What is claimed is:

1. A torque monitoring apparatus comprising first and second annular members, each annular member having an outer peripheral surface, said apparatus including a common hub, each said first and second annular members being connected to said common hub by separate support members, a plurality of indicating members mounted on each peripheral surface with each indicating member having one portion mounted on one peripheral surface and another portion extending over the said peripheral surface of said second annular member, said plurality of indicating members being substantially evenly spaced on said respective peripheral surface, at least one sensing member located adjacent to said peripheral surfaces, said sensing member being capable of detecting the relative movement of the said consecutive indicating members alternatively mounted on said peripheral surface of said two annular members, said separate support members comprising spokes connecting said first and second annular members to said common hub and said spokes being made from the same material as said first and second annular members.

2. The apparatus as claimed in claim 1 wherein said indicating members are each ferromagnetic.

3. The apparatus as claimed in claim 1 wherein said indicating members are each reflective.

4. The torque monitoring apparatus as claimed in claim 1 wherein said first and second annular members are each made from a high density elastomer.

5. The torque monitoring apparatus as claimed in claim 1 wherein said first and second annular members are each made from a metal.

6. A flexible coupling for establishing a drive connection between a driving and a driven shaft, said coupling incorporating flexible elements to accommodate misalignment between axes of the shafts and a torque monitoring apparatus, said flexible coupling and torque monitoring apparatus comprising first and second annular members, each annular member having an outer peripheral surface, said apparatus including a common hub, each said first and second annular members being connected to said common hub by separate arrays of evenly spaced spokes that are capable of flexing, a plurality of indicating members disposed about said annular members, said plurality of indicating members being substantially evenly spaced on said respective annular member, at least one sensing member located adjacent to said peripheral surfaces, said sensing member being capable of detecting the relative movement of said consecutive indicating members mounted on said annular members, a connecting flange associated with each annular member for connection to a drive and a respective driven shaft.

7. The torque monitoring apparatus as claimed in claim 6 wherein said apparatus is manufactured from a high density elastomer.

8. The torque monitoring apparatus as claimed in claim 6 wherein said apparatus is made from a metal.

9. The torque monitoring apparatus as claimed in claim 6 wherein reflecting members are placed on at least some of said spokes.

10. The torque monitoring apparatus as claimed in claim 9 wherein an illuminating device is located adjacent to said apparatus and a photodetector is positioned to detect light reflected from said reflective member.

11. The torque monitoring apparatus as claimed in claim 1 or 6 where a plurality of sensing members are employed.

12. A torque monitoring apparatus comprising first and second annular members, each annular member having an outer peripheral surface said apparatus including a common hub, each said first and second annular members being connected to said common hub by separate arrays of evenly spaced spokes that are capable of flexing, a plurality of indicating members disposed about said annular members, said plurality of indicating members being substantially evenly spaced on said respective annular member, at least one sensing member located adjacent to said peripheral surfaces, said sensing member being capable of detecting the relative movement of said consecutive indicating members mounted on said annular members.

13. The invention of claim 12 wherein each of said spokes has opposite ends with one end being on said common hub and the other end being adjacent said peripheral surface, said spokes of each annular member lying in a respective common plane, each of said spokes having a middle portion and each said spoke tapering from said ends toward said middle portion to thereby provide more uniform stress distribution along a respective spoke.

14. The invention of claim 13 wherein said one end of each end of a said spoke is formed integrally with said hub and said other end of a said spoke is formed integrally with a respective said peripheral surface.

15. The invention of claim 12 wherein said indication members are mounted on each peripheral surface with each indicating member having one portion mounted on one peripheral surface and another portion extending over the said peripheral surface of said other member.

16. A torque monitoring apparatus comprising first and second annular members, each annular member having an outer peripheral surface, said apparatus including a common hub, each said first and second annular members being connected to said common hub by separate arrays of evenly spaced spokes that are capable of flexing, a plurality of indicating members disposed about said annular members, said plurality of indicating members being substantially evenly spaced on said respective annular member, at least one sensing member located adjacent to said peripheral surfaces, said sensing member being capable of detecting the relative movement of said consecutive indicating members mounted on said annular members, each of said spokes having opposite ends with one end being on said common hub and the other end being adjacent said peripheral surface, said spokes of each annular member lying in a respective common plane, each of said spokes having a middle portion and each said spoke tapering from said ends toward said middle portion to thereby provide more uniform stress distribution along a respective spoke, said one end of each end of a said spoke being formed integrally with said hub and said other end of a said spoke is formed integrally with a respective said peripheral surface, said indication members being mounted on each peripheral surface with each indicating member having one portion mounted on one peripheral surface and another portion extending over the said peripheral surface of said other member.

17. The invention as claimed in claim 6 wherein reflective members are placed on at least some of said spokes.

18. The invention as claimed in claim 6 wherein said indicating members are ferromagnetic.

19. The invention as claimed in claim 6 wherein said indicating members are reflective.

20. The invention as claimed in claim 6 wherein said annular members are made from a high density elastomer.

21. The invention as claimed in claim 6 wherein said apparatus is made from a steel alloy.

* * * * *